US011707016B2

United States Patent
Dharna et al.

(10) Patent No.: US 11,707,016 B2
(45) Date of Patent: Jul. 25, 2023

(54) CROSS-GROWER STUDY AND FIELD TARGETING

(71) Applicant: CLIMATE LLC, Saint Louis, MO (US)

(72) Inventors: Jyoti Dharna, San Francisco, CA (US); Morrison Jacobs, San Francisco, CA (US); Beiyan Zeng, San Francisco, CA (US); Allan Trapp, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 37 days.

(21) Appl. No.: 17/315,307

(22) Filed: May 9, 2021

(65) Prior Publication Data

US 2021/0307243 A1 Oct. 7, 2021

Related U.S. Application Data

(63) Continuation of application No. 15/989,944, filed on May 25, 2018, now Pat. No. 10,999,967.

(51) Int. Cl.
*A01C 21/00* (2006.01)
*G06N 5/02* (2023.01)

(52) U.S. Cl.
CPC ............ *A01C 21/005* (2013.01); *A01C 21/00* (2013.01); *A01C 21/007* (2013.01); *G06N 5/02* (2013.01)

(58) Field of Classification Search
CPC ...... A01C 21/005; A01C 21/00; A01G 22/00; A01B 79/005; G06N 5/02; G06Q 50/02; G06Q 50/00; G06Q 10/06313

(Continued)

(56) References Cited

U.S. PATENT DOCUMENTS 7,047,133 B1 * 5/2006 Dyer ............... G06Q 10/04
                                                        702/5
7,440,901 B1 * 10/2008 Dlott .............. G06Q 10/10
                                                        235/375

(Continued)

FOREIGN PATENT DOCUMENTS

WO    WO2017/066078    4/2017
WO    WO2017/096073    6/2017

(Continued)

OTHER PUBLICATIONS

The International Bureau of WIPO, "International Preliminary Reporton Patentability" in application No. PCT/US2019/033728, dated Dec. 1, 2020, 5 pages.

(Continued)

*Primary Examiner* — Christopher D Hutchens
*Assistant Examiner* — Steven J Shur
(74) *Attorney, Agent, or Firm* — Harness, Dickey & Pierce, P.L.C.

(57) ABSTRACT

A computer-implemented method of targeting grower fields for crop yield lift is disclosed. The method comprises receiving, by a processor, crop seeding rate data and corresponding crop yield data over a period of time regarding a group of fields associated with a plurality of grower devices; receiving, by the processor, a current seeding rate for a grower's field associated with one of a plurality of grower devices; determining, whether the grower's field will be responsive to increasing a crop seeding rate for the grower's field from the current seeding rate to a target seeding rate based on the crop seeding rate data and corresponding crop yield data; preparing, in response to determining that the grower's field will be responsive, a prescription including a new crop seeding rate and a specific hybrid to be implemented in the grower's field.

20 Claims, 11 Drawing Sheets

(58) Field of Classification Search
USPC .................................. 47/581.1 R, 58.1 R
See application file for complete search history.

(56) References Cited

U.S. PATENT DOCUMENTS

| | | | | |
|---|---|---|---|---|
| 8,671,006 | B2* | 3/2014 | Zyskowski | G06Q 10/0637 |
| | | | | 800/260 |
| 10,091,925 | B2* | 10/2018 | Aharoni | A01B 79/005 |
| 10,990,967 | B2 | 5/2021 | Dharna et al. | |
| 11,266,056 | B2* | 3/2022 | Nair | A01B 33/08 |
| 2006/0074560 | A1* | 4/2006 | Dyer | G06Q 10/04 |
| | | | | 702/5 |
| 2012/0101861 | A1* | 4/2012 | Lindores | A01B 79/005 |
| | | | | 705/7.11 |
| 2012/0109614 | A1* | 5/2012 | Lindores | G06V 20/188 |
| | | | | 703/11 |
| 2013/0185104 | A1* | 7/2013 | Klavins | A01M 17/00 |
| | | | | 705/7.12 |
| 2015/0260255 | A1 | 9/2015 | Tan et al. | |
| 2016/0232621 | A1* | 8/2016 | Ethington | G06Q 50/02 |
| 2016/0260021 | A1* | 9/2016 | Marek | E02B 13/00 |
| 2017/0055433 | A1 | 3/2017 | Jamison | |
| 2017/0105335 | A1* | 4/2017 | Xu | G06N 5/04 |
| 2017/0270446 | A1* | 9/2017 | Starr | G01C 11/00 |
| 2019/0357425 | A1 | 11/2019 | Dharna | |

FOREIGN PATENT DOCUMENTS

| | | |
|---|---|---|
| WO | WO2017/119987 | 7/2017 |
| WO | WO2017/136417 | 8/2017 |

OTHER PUBLICATIONS

International Searching Authority, "Search Report" in application No. PCT/US19/33728, dated Aug. 9, 2019, 7 pages.

Current Claims in application No. PCT/US2019/033728, dated Dec. 2020, 7 pages.

Current Claims in application No. PCT/US19/33728, dated Aug. 2019, 4 pages.

Dharna, U.S. Appl. No. 15/989,944, filed May 25, 2018, Final Office Action dated Nov. 24, 2020.

Dharna, U.S. Appl. No. 15/989,944, filed May 25, 2018, Notice of Allowance dated Feb. 19, 2021.

Dharna, U.S. Appl. No. 15/989,944, filed May 25, 2018, Interview Summary dated Sep. 21, 2020.

Dharna, U.S. Appl. No. 15/989,944, filed May 25, 2018, Advisory Action dated Jan. 22, 2021.

Dharna, U.S. Appl. No. 15/989,944, filed May 25, 2018, Office Action dated Jul. 29, 2020.

Dharna, U.S. Appl. No. 15/989,944, filed May 25, 2018, Interview Summary dated Dec. 18, 2020.

* cited by examiner

Fig. 2
(a)
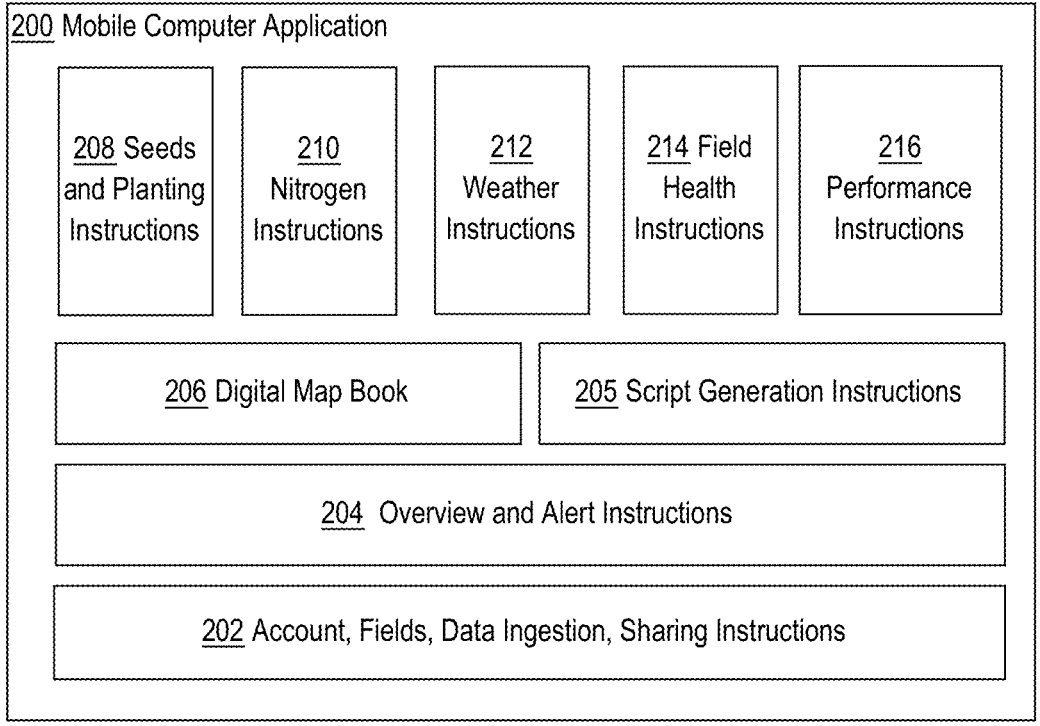
(b)
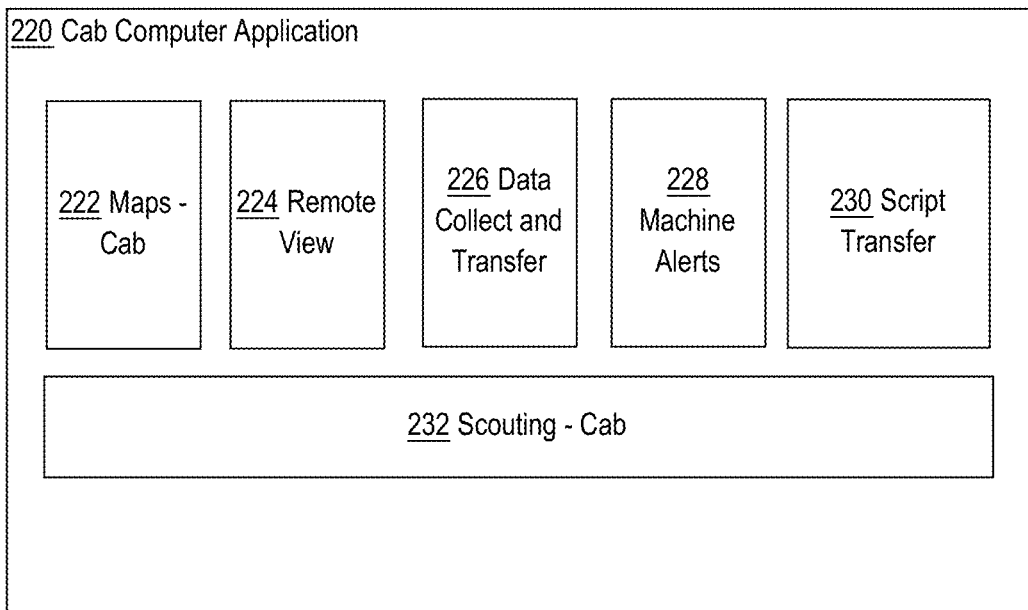

Data Manager

| | Nitrogen | Planting | Practices | Soil | |
|---|---|---|---|---|---|
| Planting 1(4 Fields) Crop Corn Product Plant Date: 2016-04-12 ILU 112 \| Pop: 34000 [Edit] [Apply] | Planting 2(0 Fields) Crop Corn Product Plant Date: 2016-04-15 ILU 83 \| Pop: 34000 [Edit] [Apply] | Planting 3(0 Fields) Crop Corn Product Plant Date: 2016-04-13 ILU 83 \| Pop: 34000 [Edit] [Apply] | Planting 4(1 Fields) Crop Corn Product Plant Date: 2016-04-13 ILU 112 \| Pop: 34000 [Edit] [Apply] | + Add New Planting Plan | |

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1 Corn \| 100 \| Boone, IA | Corn | — | DMC82-M | 112 | 160 | 34000 | Apr |
| ☐ Austin, MN 1 Corn \| 100 \| Fredricks, MN | Corn | — | DMC82-M | 114 | 160 | 36000 | Apr |
| ☐ Boone, IN 1 Corn \| 100 \| Boone, IA | Corn | — | DMC82-M | 112 | 150 | 34000 | Apr |
| ☐ Champaign 1 Corn \| 100 \| Champaign, IL | Corn | — | — | — | 200 | 34000 | Apr |
| ☐ E Nebraska 1 Corn \| 100 \| Burt, NE | Corn | — | — | 112 | 160 | 34000 | Apr |

FIG. 6

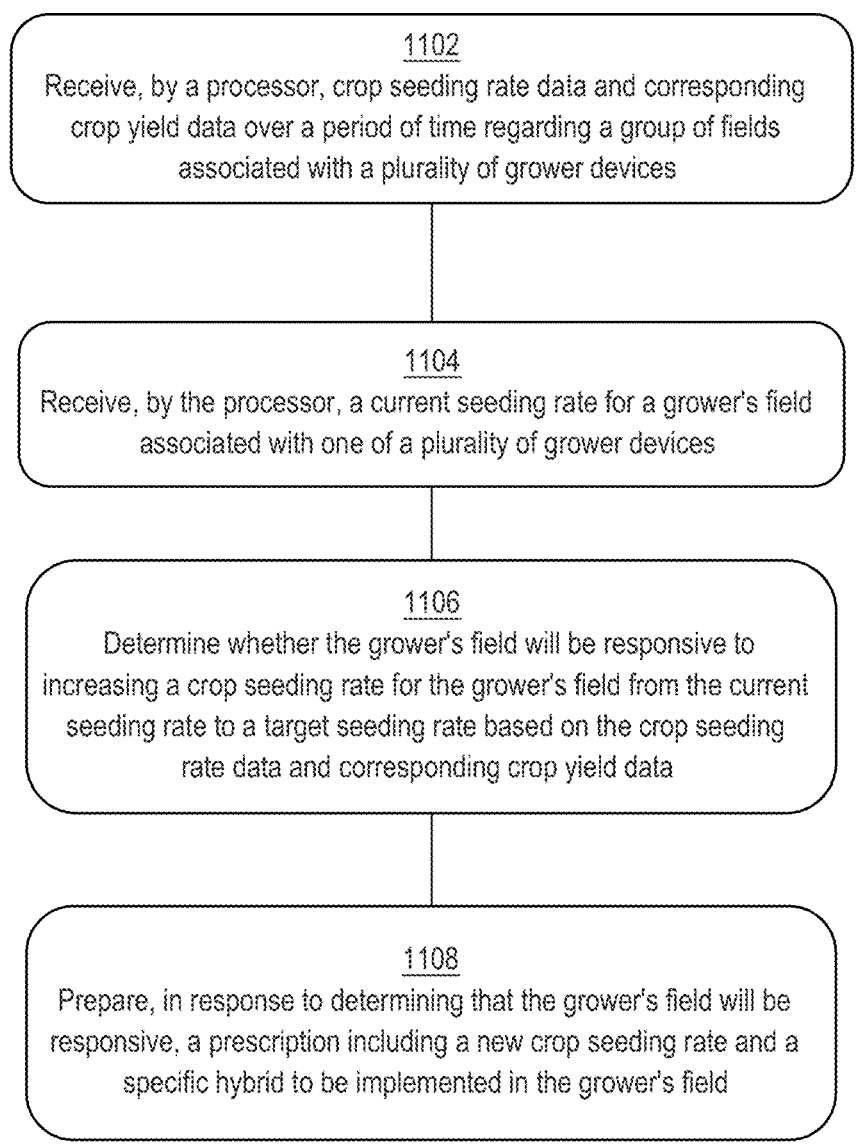

CROSS-GROWER STUDY AND FIELD TARGETING

BENEFIT CLAIM

This application claims the benefit under 35 U.S.C. § 120 as a Continuation of application Ser. No. 15/989,944, filed May 25, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

The present disclosure relates to the technical area of cross-grower study and field targeting and more specifically to the technical area of designing, tracking, and validating experiments to be applied to fields of multiple growers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Agricultural operations tend to consume significant time, money, and other resources. Therefore, an ability to speed up individual operations, such as the planting of a specific volume of seeds, or to shorten any trial-and-error process in achieving a certain goal, such as a certain yield level, is generally helpful. With the help of computers, more advanced agricultural implements are being made and larger volumes of sensor data related to various aspects of agricultural operations, which often span multiple growers' fields, are being generated and ready for processing. A systematic, end-to-end approach to collect such data across the growers' fields, transform the data into analytical insights or actionable recommendations for speeding up individual operations or to shorten any trial-and-error process, and distribute the transformation results to all the grower systems can be useful.

One of the initial components in such a systematic approach can be field targeting, selecting some of the growers' fields for specific agricultural experiments with predicted outcomes. An example experiment (or specifically a targeted trial) is to increase the seeding rate by a specific amount to improve the crop yield by a certain level. Different fields having different characteristics may be available for prescription-based operations by performing specific experiments towards predicted results, and the performance of individual fields may be improved in different ways, often based on the performance of the other fields. It can be a challenge to identify which experiments can be performed on individual fields and how the experiments should be coordinated across the multiple fields to achieve the best aggregate outcomes.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 11 illustrates an example process performed by the field study server of targeting grower fields for crop yield lift.

DETAILED DESCRIPTION

Figure 1:
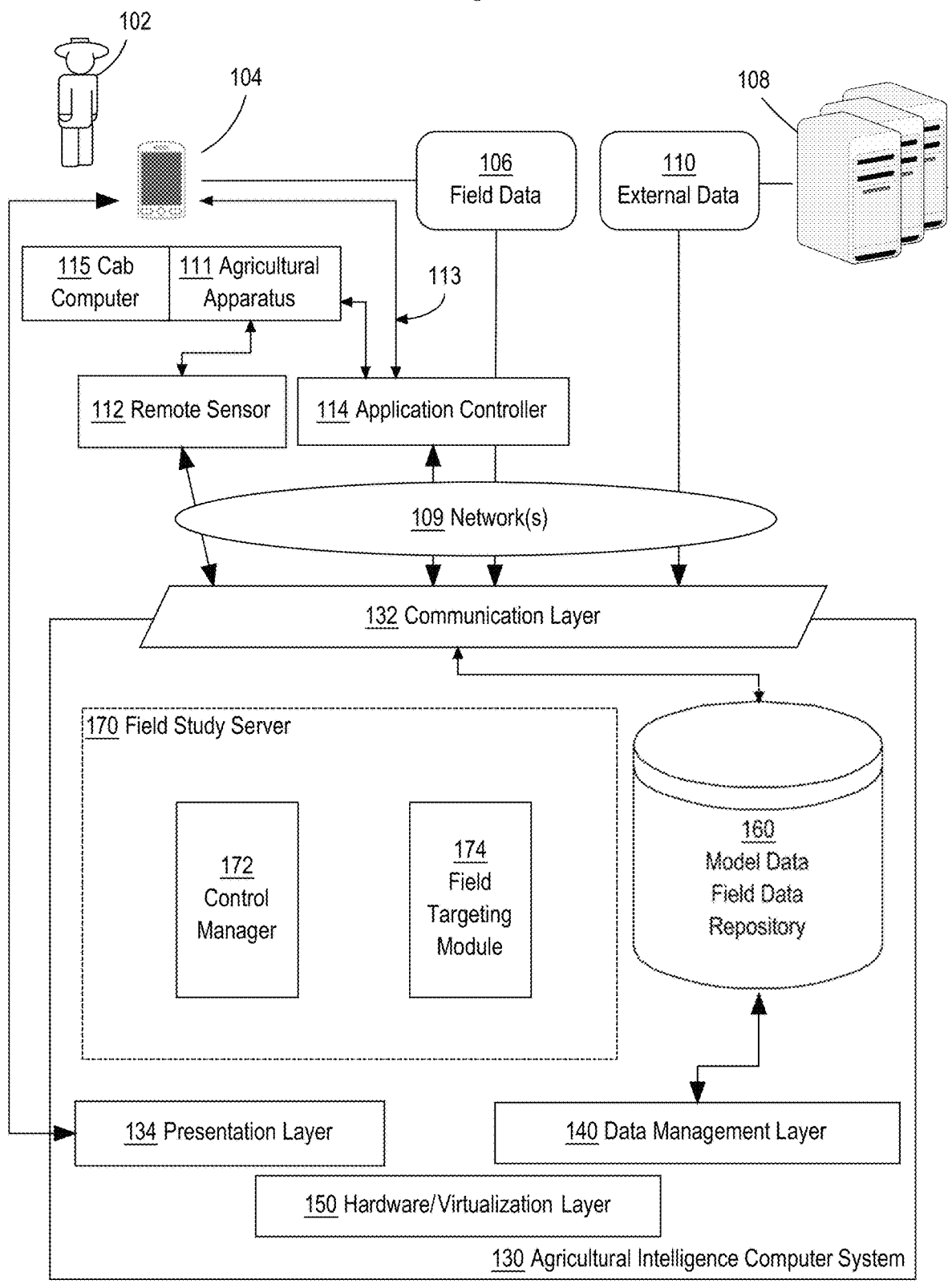
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. FUNCTIONAL DESCRIPTION
   3.1 CROSS-GROWER FIELD STUDY
   3.2 FIELD TARGETING

1. General Overview

A computer-implemented system for managing cross-grower field studies and related methods are disclosed. In some embodiments, the system is programmed or configured with data structures and/or database records that are arranged to conduct a computerized cross-grower field study across multiple growers' fields through an end-to-end process. In some embodiments, the system can be programmed to construct models based on products or other concepts to predict yield lifts or achieve other agricultural objectives. The system can be also programmed to create experiments in identified fields to validate the predicted lifts, while demonstrating yield outcomes transparently. The system can further be programmed to capture planted, in-season and harvest data for downstream analysis. In addition, the system can be programmed to validate that the experiments were performed and managed as prescribed. The system can also be programmed to analyze in-season and harvest in real-time and respond appropriately. Moreover, the system can be configured to share in-season and end-of-season insights & recommendations across grower systems.

In some embodiments, the system is programmed to target certain fields that are predicted to be responsive to a seeding rate increase for experiments to achieve crop yield lift. A baseline for product (crop yield) responsiveness is typically established initially based on historical data correlating crop densities and crop yield over a number of years for a group of fields that might be similar in crop hybrid, location, or yield lift management practice. The system can be configured to determine an average or optimal seeding rate as part of the baseline. The system can also represent the baseline by a complex data structure, such as a decision tree. For a grower's field, the system is then configured to estimate the impact of increasing the current seeding rate to a target seeding rate on the crop yield lift for the grower's field from the baseline and in turn predict the product responsiveness of the grower's field. In response to determining that the grower's field will be sufficiently responsive to a seeding rate increase, the system can be configured to target the grower's field for an experiment and prepare a design for the experiment, which may be parameterized by a new seeding rate and a crop hybrid. The new seeding rate is typically the target seeding rate unless it is overridden by a grower-intended seeding rate, and the crop hybrid is generally consistent with the seeding rate change.

The system produces many technical benefits. In targeting growers and growers' fields, the system employs novel approaches to determine how to apply specific experiments. These approaches lead to a higher yield level for a field within a given timeframe, shorten the time to achieve a certain yield lift, or improve certain operations of the field. The application of a variety of carefully designed experiments to a variety of cross-grower fields supports more complex, high-dimensional analysis. The wide coverage of these experiments thus leads to collecting more field data and generating more agricultural insight that promotes field growth within a shorter amount of time. Furthermore, by integrating these approaches into a streamlined framework, the system allows these approaches to produce the largest effect while requiring minimal human efforts.

Another benefit comes from increasing the complexity and usefulness of each experiment by organizing both targeted trials and control trials within each experiment. Such experiments help simplify and focus downstream analysis and provide clear demonstration of the benefits of the targeted trials to growers. Yet another benefit comes from real-time and continuous performance of data collection, validation of experiment execution, and analysis of experimental outcomes with respect to predicted outcomes. Such measures increase the success rates of the prescribed experiments and also expedite the achievement of predicted outcomes that benefit the fields. The rigor and efficiency of the analysis provides further benefits to the growers and their fields.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
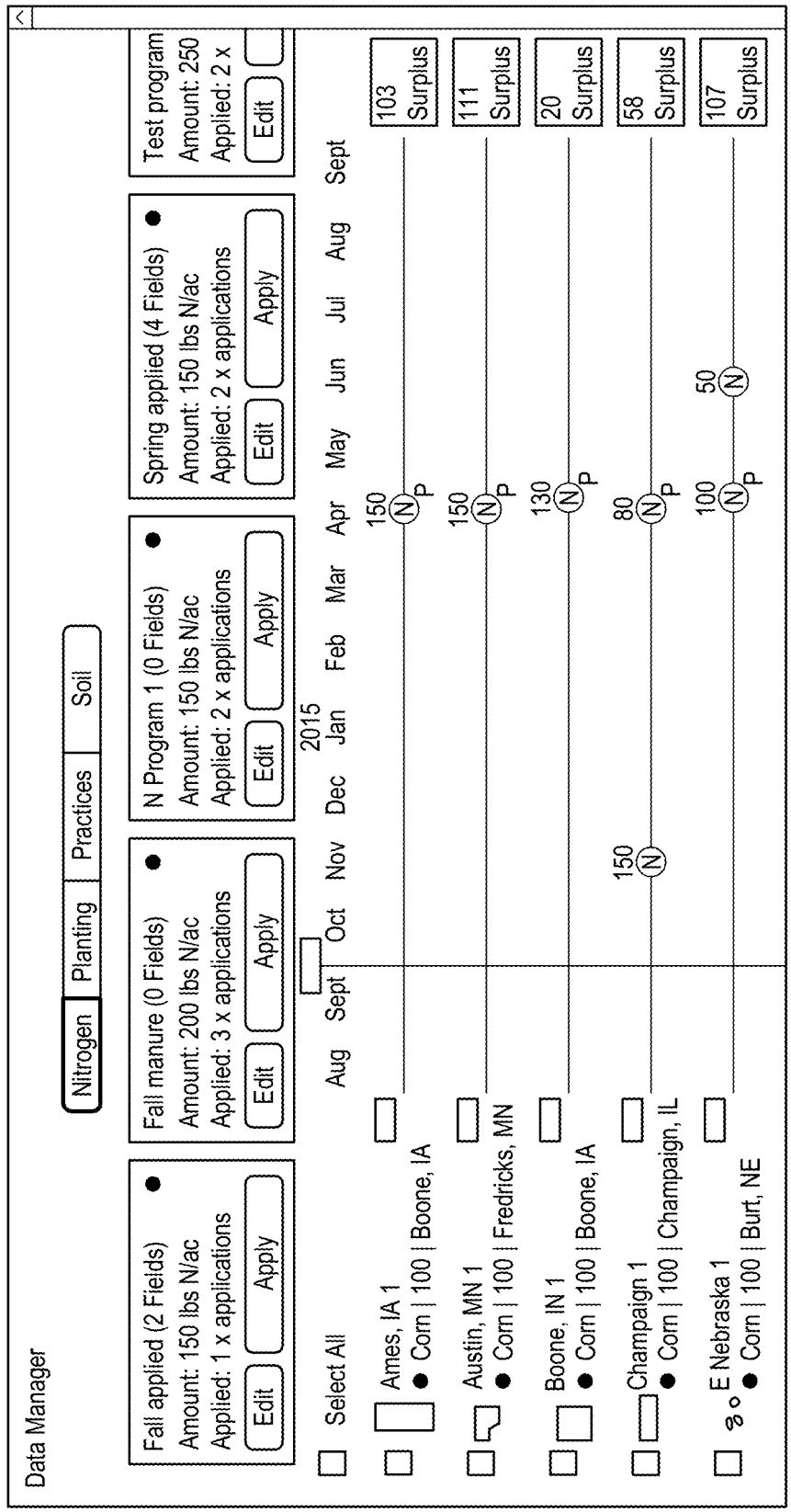
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, agricultural intelligence computer system 130 is programmed to comprise a field study server ("server") 170. The server 170 is further configured to comprise a control manager 172 and a field targeting module 174. The control manager 172 is configured to manage an end-to-end cross-grower field study. The end-to-end process can comprise various components, including targeting growers and their fields, prescribing experiments to the fields to (demonstrate and) achieve predicted outcomes, collecting data from the prescribed experiments, validating execution of the prescribed experiments, analyzing the collected data to generate useful information for the growers, including farming tips and recommendations, and distributing such information across grower systems. The control manager 172 is further configured to streamline the end-to-end process and apply appropriate techniques in each of the components. The field targeting module 174 is programmed to focus on the field targeting component in the end-to-end process. Specifically, the field targeting module 174 is programmed to determine which experiments need to be performed on which of the fields. The control manager 172 can be configured to communicate with the field targeting module 174 for implementing the field targeting component in the end-to-end process. The server 170 can include additional modules to focus on other components in the end-to-end process.

Each component of the server 170 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the field targeting component 174 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
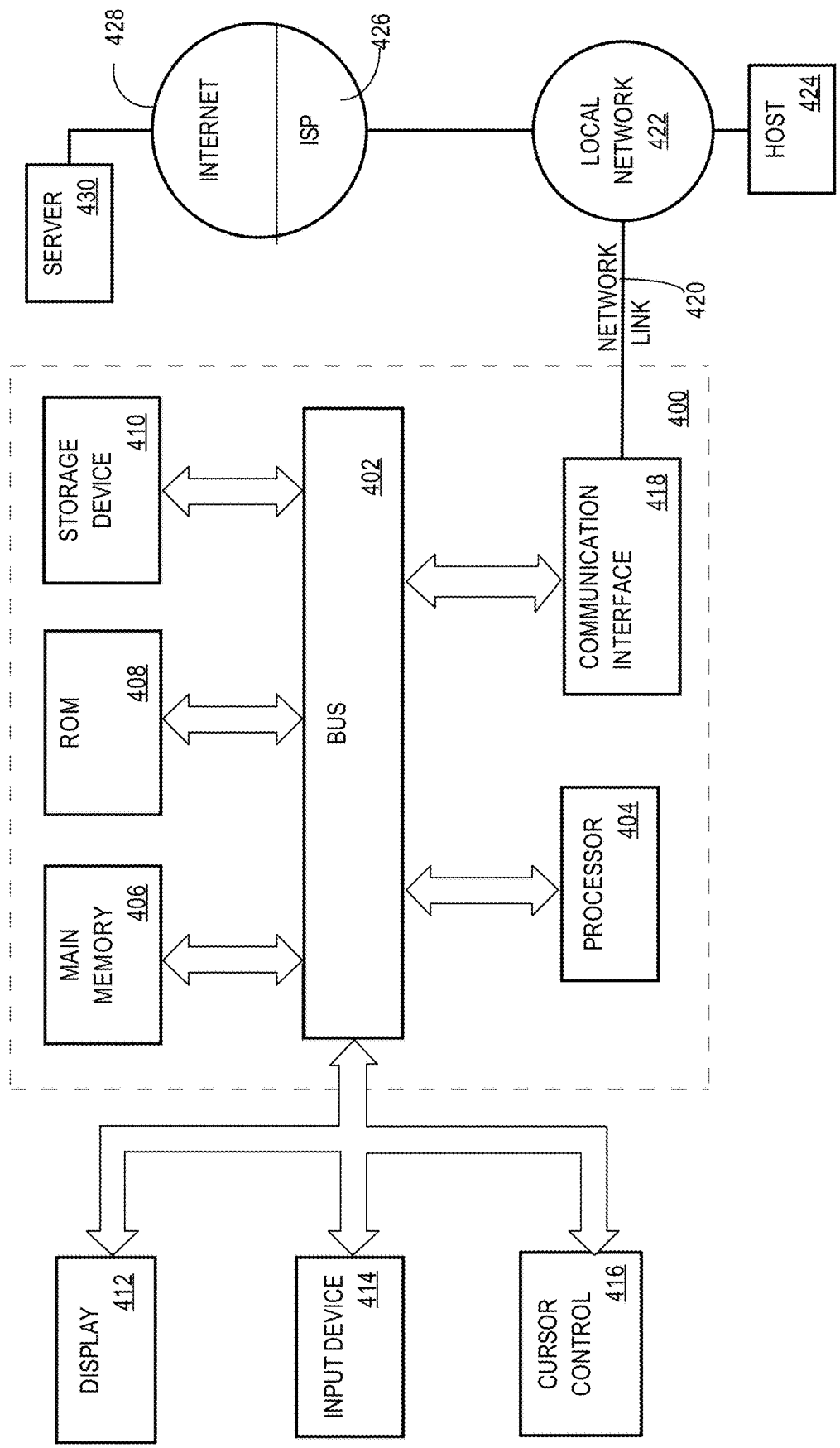
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
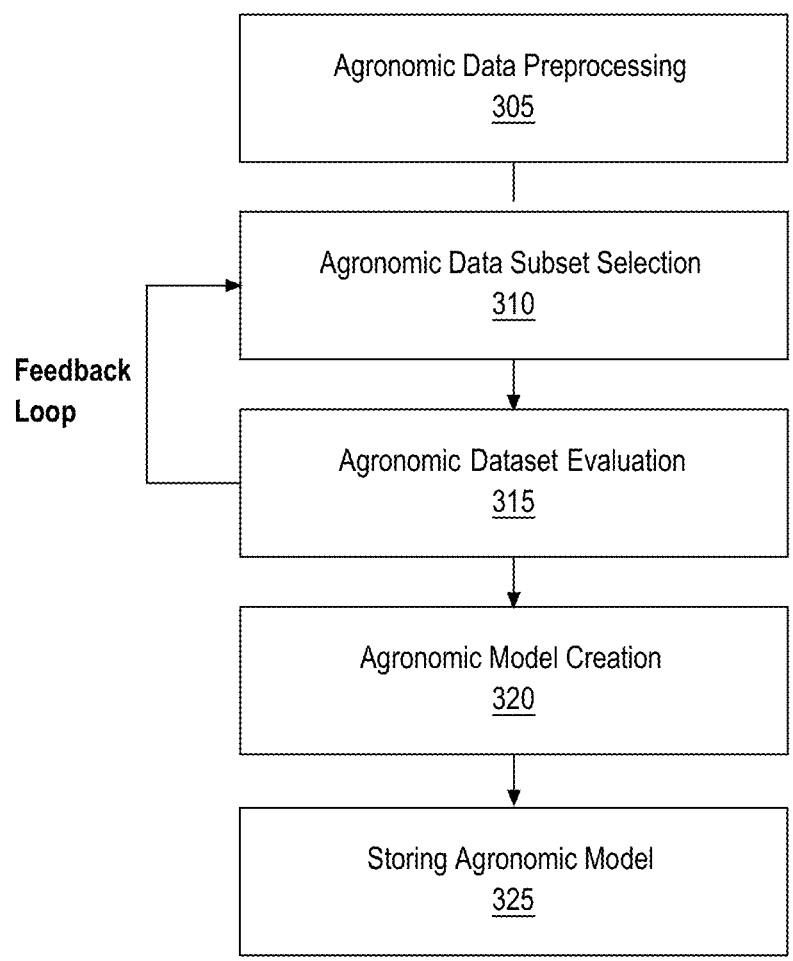
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Description

3.1 Cross-Grower Field Study

Figure 7:
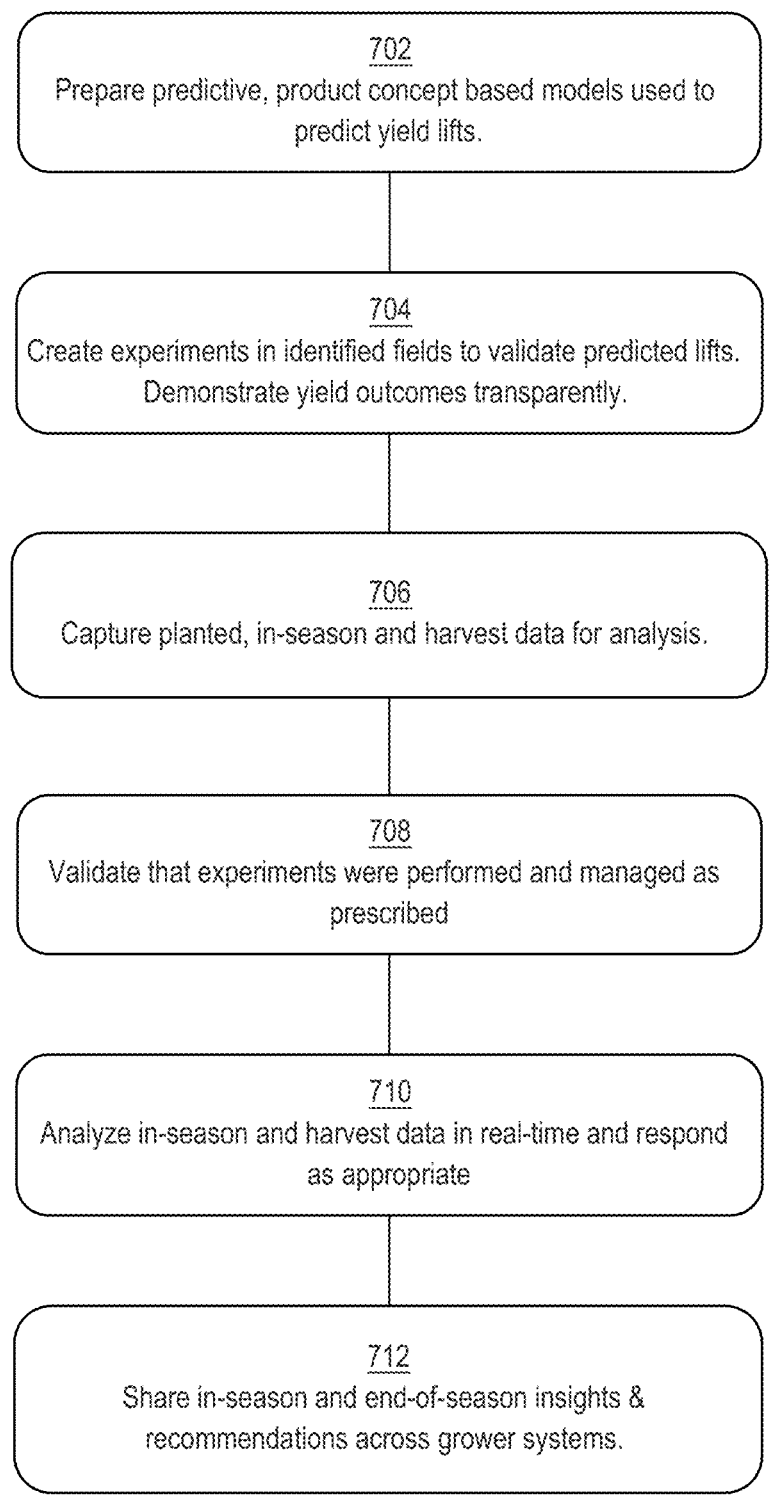
FIG. 7 illustrates an example process performed by the field study server from field targeting to information distribution across grower systems.

FIG. 7 illustrates a process performed by the field study server from field targeting to information distribution across grower systems. In some embodiments, the server 170 is programmed to perform automated cross-grower analysis, which can comprise computationally targeting grower fields, prescribing experiments to grower fields, collecting data from prescribed experiments, validating execution of the prescribed experiments, analyzing the collected data, and distributing analytical results across grower systems.

In step 702, the server 170 is programmed to computationally target grower fields. In some embodiments, given relevant data regarding a list of grower fields, the server 170 is programmed to design specific experiments for specific grower fields. The objective of an experiment is typically to increase the yield of one or more fields by a certain level, although it can also be related to reducing the inputs or an improvement of any other aspect of the fields. The design of an experiment or specifically a targeted trial (to be distinguished from a controlled trial, as further discussed below) includes determining which attributes of a field might be related to an experimental objective and how a change in the values of some of those attributes might help achieve the experimental objective. One example experiment is to increase the seeding rate of a field by an amount in order to increase or lift a crop yield by a certain amount. Another example experiment is to increase the fungicide usage of a field by an amount in order to achieve a reduce a disease spread by a certain amount.

In some embodiments, the server 170 is programmed to manage the list of grower fields at a granular level. The server 170 is therefore configured to identify certain boundaries or other problematic areas of the fields that will not participate in prescribed experiments, and further determine specific strips or squares, with buffer areas in between, that will participate in prescribed experiments.

As an example, to determine for which portions of which fields to increase the seeding rate by a certain amount or by what amount to increase the seeding rate for specific fields, the server 170 can be configured to evaluate, for each field, the hybrid or variety of crop types, the current seeding rate, the historical yearly yield, how a change in seeding rate affected the yield in the past, how the seeding rate was affected by weather or other variables, or other factors affecting the field. While it is called an experiment, the server 170 is configured to predict the outcome of the experiment and determine whether to apply the experiment based on the predicted outcome. For example, the server 170 can be configured to apply only those experiments with highest predicted yield lifts in the study. Therefore, each experiment essentially includes a recommendation, such as increasing the seeding rate by a certain amount, that is to be validated.

In some embodiments, targeting grower fields also involves the design of multiple experiments to be applied to the fields of one or more growers in a coordinated fashion. For example, a single field can be divided into multiple strips for planting a hybrid of multiple crops. While different fields might specifically benefit from different experiments at a certain time, the collection of all the fields can benefit from coordinated experiments so that as much analytical insight can be shared across grower fields as possible for long-term benefits. For example, some growers might have a limited number of fields where only a limited number of experiments involving a small number of attributes or a small number of values for a certain attribute can apply this year. Those fields can then benefit from the application of additional experiments to other growers' fields that involve different attributes or different values for the same attributes.

In some embodiments, the server 170 is programmed to start designing, selecting, or applying experiments in response to specific triggers. Such triggers may include when a field is under-performing (e.g., low crop yield within a certain timeframe), when a field is in a usual condition (e.g., low soil moisture or nitrate), when a change occurs in the environment (e.g., extra sunlight), or when an experiment prescribed to a similar field has produced a certain outcome. These triggers can be detected from the data collected during the implementation of the prescribed experiments, as further discussed below. Each trigger generally represents an opportunity to improve the performance of a field or gain specific insight into certain agricultural phenomena or relationships.

In step 704, the server 170 is programmed to prescribe experiments to grower fields. In some embodiments, the design or selection of experiments can be carried out automatically according to a predetermined schedule, such as at the beginning of every year or every growing season. The prescribing of experiments can also be performed automatically. The server 170 can be configured to generate the prescription, plan, or scheme for an experiment that is to be understood by a human, a machine, or a combination of both. For example, one experiment may be to plant certain seeds at a certain rate on a certain grower's fields. The plan for the experiment can include a variety of details, such as the type of seeds, the destination of the seeds within the fields, the volume of seeds to plant each day, or the time to plant the seeds each day.

In some embodiments, the prescription or scheme also includes details for implementing a control trial as opposed to the targeted trial (the original, intended experiment), to enable a grower to better understand the effect of the targeted trial. Generally, the control trial involves a contrasting value for the relevant attribute, which could be based on what was implemented in the field in the present or in the past. For example, when the targeted trial is to increase the seeding rate by a first amount to increase the yield by a certain level, the control trial may be to not increase the seeding rate (maintaining the present seeding rate) or by a second amount that is much higher or much lower than the first amount. The prescription can include additional information, such as when and where the targeted trial and the control trial are to be implemented on the grower's fields. For example, in one scheme, a grower's field can be divided into strips, and the prescription can indicate that the first strip is to be used for the targeted trial, the second strip is to be used for the control trial, and this pattern is to repeat three times geographically (the second time on the $3^{rd}$ and fourth strips, and the 3 time on the $5^{th}$ and the sixth strips). The prescription can generally incorporate at least some level of randomization in managing the targeted trial and the control trial, such as randomly assigning certain strips to either trial, to minimize any bias that might exist between the two trials.

In some embodiments, the server 170 is programmed to transmit the plan directly to the agricultural implements of the relevant fields, such as a seed dispenser or another planter registered under the grower of the fields or associated with the specific fields. Depending on how smart the planter is, the planter may automatically implement at least some of the experiment according to the plan or at least display the plan to the grower as grower manually operates the planter. For example, the plan can be translated into electronic signals for controlling the wakeup time of the planter, the moving or rotational speed of the planter, or the route taken by the planner. Alternatively, the server 170 can be programmed to transmit the plans or schemes for the experiment to other smart devices registered under the grower, such as a mobile device, to the extent that part of the plan needs to be implemented manually or simply for informational purposes.

In some embodiments, instead of transmitting the entire scheme for an experiment to a smart device, whether it is an agricultural implement or a person digital assistant, the server 170 is programmed to transmit the scheme incrementally and timely. For example, when the scheme involves the performance of daily tasks, the server 170 can be configured to send a portion of the scheme corresponding to each day's work everyday. The server 170 can also be configured to deliver reminders to the grower's mobile devices, for example, for the performance of certain tasks according to the scheme.

In step 706, the server 170 is programmed to collect data from prescribed experiments. In some embodiments, the server 170 is programmed to receive data from the same agricultural implements to which the experiment schemes or plans were transmitted, or from the same personal computers, including mobile devices, registered under the growers. The agricultural implements can be equipped with sensors that can capture many types of data. In addition to data related to the variables involved in the experiment, such as the volume of seeds actually planted, the time of actual planting, the actual moving or rotational speed of the agricultural implement, the route actually taken by the agricultural implement, or the crop yield actually achieved, an agricultural implement can capture additional data related to the weather, such as the amount of sunlight, humidity, pollen, wind, etc. The agricultural implement can also record additional data related to its internal state, including whether different components are functioning properly, when the agricultural implement is cleaned or maintained, how often the agricultural implement is used, or whether the agricultural implement is used in any unusual manner. Some of these types data can be observed by sensors integrated with personal computing devices or directly by growers and subsequently reported via the personal computing devices to the server 170. In general, the data can be transmitted by an agricultural implement or a personal computing device to the server 170 once the data becomes available, upon request by the server 170, or according to a predetermined schedule.

In step 708, the server 170 is programmed to validate execution of the prescribed experiments. In some embodiments, the server 170 is programmed to determine whether the prescribed experiment is properly carried out according to the plan or scheme for the experiment. The objective is to enable proper implementation of the prescribed experiments in order to receive the predicted results. For the variables involved in the scheme, the server 170 is programmed to compare the actual value, such as the volume of seeds actually planted at a specific location within a one-hour span, and the prescribed value. The server 170 is configured to report any detected discrepancy. For example, at least a warning can be sent to the grower's personal computing device that if the plan is not strictly followed, the expected benefit of the prescribed experiment will not be achieved.

In some embodiments, the server 170 is programmed to evaluate other collected data and recommend remedial steps. Specifically, the server 170 can be configured to transmit a series of steps for diagnosing whether a component of the agricultural implement is functioning properly. For example, when the volume of seeds actually planted at a specific location within a one-hour span is greater than the prescribed value, the bin holding the seeds to be planted or the scale for weighing the seeds to be planted may be out of order. Therefore, the server 170 might be programmed to request an inspection of the bin or the scale. When the malfunctioning of the agricultural implement is detected directly by sensors or through certain diagnosis, the server 170 can be programmed to transmit a similar recommendation for recalibrating or repairing the agricultural implement. On the other hand, upon a determination that certain steps are completely skipped, the server 170 can be programmed to transmit an instruction to follow those steps, or a suggestion for readjusting reminder alarms or for inspecting the agricultural implements.

In some embodiments, the server 170 can be programmed to validate the execution of each prescribed experiment according to a predetermined schedule, such as every month, or at soon as error signals are received. The server 170 can also be programmed to validate the execution of all prescribed experiments according to a specific paradigm, such as one based on randomly sampling, in order to conserve resources.

In step 710, the server 170 is programmed to analyzing the collected data. In some embodiments, the server 170 is programmed to further analyze the data, to adjust the predictions or the plans for the prescribed experiments, or to glean specific insight that can be used in designing future experiments. Such analysis can be performed periodically, at the end of a season or a year, or upon request by a grower.

In some embodiments, when a prescribed experiment was not properly carried out, the predicted result might not be obtained, and the server 170 can be programmed to adjust the prediction based on how the plan for the prescribed experiment was followed. For example, the server 170 can be configured to consider that the actual seeding rate was only 80% of the prescribed seeding rate overall, due to erroneous calibration of the agricultural implement, the skipping of certain planting steps, or other reasons, in determining the predicted crop yield might be only 80% of or otherwise less than the predicted or recommended crop yield. The server 170 can also be programmed to generate a series of remedial steps in order to realize the original prediction. For example, when the actual seeding rate was only 80% of the prescribed seeding rate overall, the server 170 can be configured to compensate for it by prescribing a seeding rate that was 20% or otherwise higher than originally prescribed for the rest of the experiment.

In some embodiments, the server 170 can be programmed to determine why even when the prescribed experiment was properly carried out, the predicted outcome was not achieved. The comparison of the data respectively gathered from the targeted trial and the control trial can often be used to eliminate certain factors from consideration. The server 170 can also be configured to detect correlations between the objective of the experiment and other field attributes or external variables. The server 170 can also be configured to detect patterns from the outcomes of similar experiments, which can help identify outliers and point to field-specific issues. The reasons behind the discrepancies between the predicted outcomes and the actual outcomes can be used for designing future experiments or generating predictions for future experiments. For example, upon detecting a significant correlation between the crop type and the seeding rate with respect to the crop yield, the server 170 can be configured to target specific fields in which certain types of crops are typically grown for an experiment that relates a seeding rate to the crop yield. Similarly, the server 170 can be programmed to predict different levels of crop yield depending on the types of crops grown in the specific field.

In some embodiments, the server 170 is programmed to design incremental experiments. To test a relatively new hypothesis, the server 170 can be configured to prescribe conservative experiments by introducing a relatively small change to one of the attributes or variables. When the actual outcome of the last prescribed experiment agrees with the predicted outcome, the server 170 can be programmed to then introducing further change to the attribute to variable. In other embodiments, the server 170 is programmed to consider the outcomes of two prescribed experiments that were applied to two similar fields and determine whether combining the two experiments might be permissible and beneficial. For example, when the relationship between the seeding rate and the yield and between the soil moisture and the yield have been clearly and separately demonstrated in two similar fields, a future experiment might be to increase the seeding rate and the soil moisture in the same experiment applied to the same field.

In step 712, the server 170 is programmed to distribute analytic insights across grower systems. In some embodiments, the server 170 is programmed to present summaries, tips, or further recommendations generated from analyzing the data obtained from the multitude of prescribed experiments across grower fields. The server 170 can be configured to transmit a report to each grower system, such as the grower's mobile device, that shows aggregate statistics over all the prescribed experiments or certain groups of prescribed experiments. The report can also indicate how the grower's fields have performed compared to the other growers' fields and indicate possible reasons based on an analysis of the difference in performance between the grower's fields and the other growers' fields. The report can highlight other prescribed experiments that are similar to the ones prescribed to the grower's fields. The report can also outline possible experiments to apply to the grower's fields in the future and solicit feedback from the grower.

In some embodiments, some or all of these steps 702 through 712 can be executed repeatedly, iteratively, or out of order. For example, data capturing and execution validation can take place periodically during a season.

3.2 Field Targeting

Figure 8:
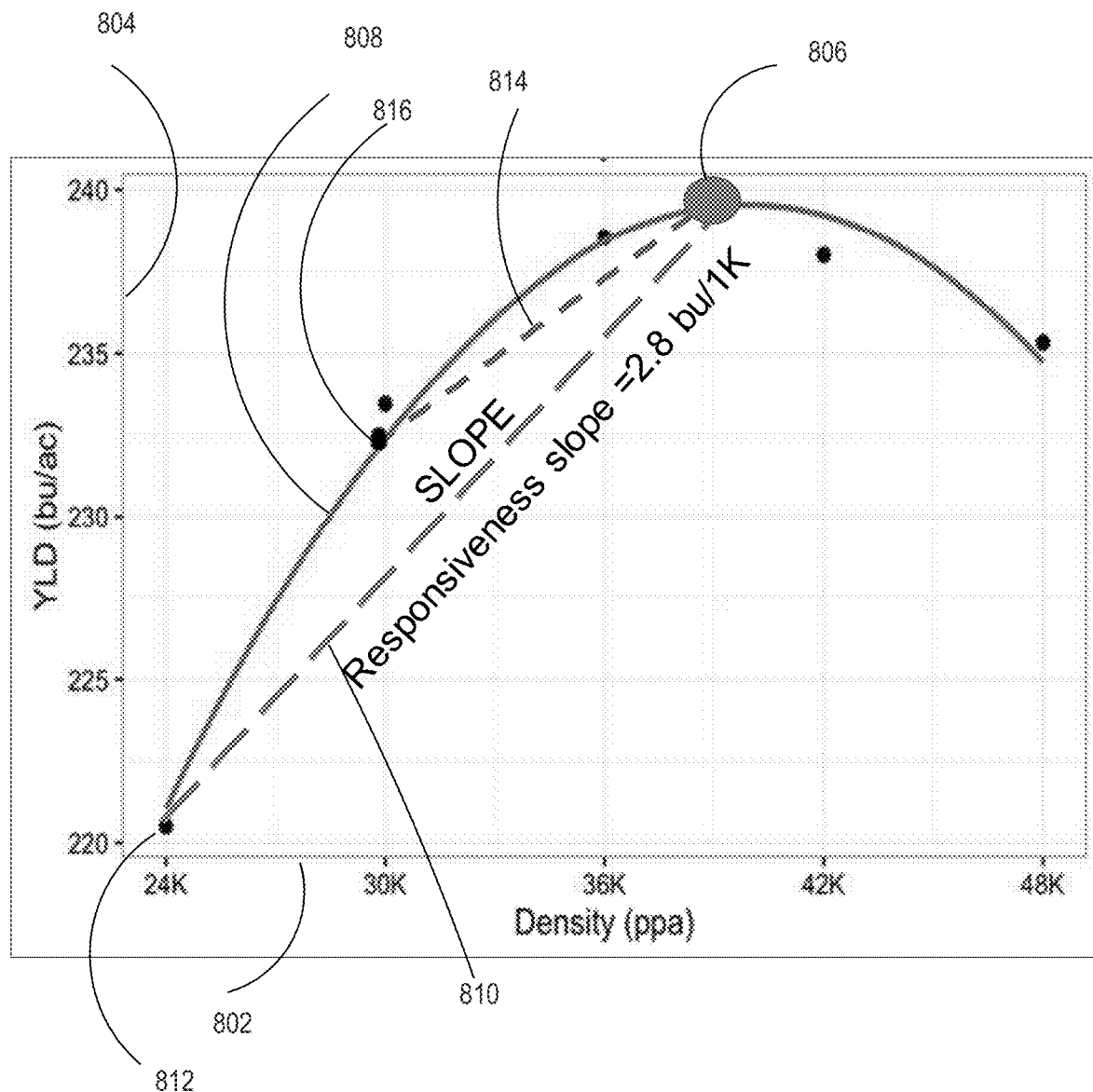
FIG. 8 illustrates an example relationship between the crop density and the crop yield for a given hybrid.

In some embodiments, the server 170 is programmed to build a model comprising computer-executable instructions for predicting product (crop yield) responsiveness of a field to a change in seeding rate. The server 170 is programmed to initially establish certain baselines from historical data that spans a number of years of a number of fields across different growers associated with different grower devices. The historical data can be obtained from internal trials and experiments or from external data sources. The number of fields can have common values in certain characteristics, such as the crop hybrid grown in a field, the location of a field, or the yield lift management practice for a field, as further discussed below. An average relationship between the crop density and the crop yield for a given hybrid can be computed from the historical data to provide a benchmark. Such a relationship is typically reflected in a quadratic curve. FIG. 8 illustrates an example relationship between the crop density and the crop yield for a given hybrid. The X-axis 802 corresponds to the crop density or seeding rate in plants per acre (ppa), and the Y-axis 804 corresponds to the crop yield in bushels per acre. In this example, the seeding rate data and the corresponding crop yield data is fitted into a quadratic curve 808. The shape and size of the quadratic curve 808 can be characterized by the slope line 810 from the data point 812 corresponding to the lowest seeding rate to the data point 806 corresponding to the optimal seeding rate and the highest crop yield. The server 170 can be programmed to select a threshold for product responsiveness based on the average relationship between the crop density and the crop yield. For example, as the slope of the slope line 810 here is about 2.8, the threshold can be set to 1.5, so that a field producing a 1.5 bushel yield lift for every 1,000 seed increase would be considered responsive, as further discussed below.

In some embodiments, instead of focusing on reaching the optimal seeding rate, the server 170 is programmed to allow flexibility in seeding rate increase. Specifically, instead of focusing on the relationship between the current seeding rate and the optimal seeding rate, the server 170 is configured to consider other factors, such as a target seeding rate less than the optimal seeding rate or a crop yield lift corresponding to a change to the target seeding rate. For example, the server 170 can be configured to cluster certain fields by hybrid and by location, and compute the average seeding rate within a cluster as the target seeding rate. The same threshold determined from the slope line noted above could still apply in evaluating product responsiveness with respect to the target seeding rate.

In some embodiments, the server 170 is configured to adopt a more complex approach, such as building a decision tree that classifies given fields with seeding rate data and crop yield data into different classes corresponding to different crop yield lift amounts based on the initial (current) seeding rate, the target seeding rate, the difference between the initial seeding rate and the target seeding rate, or other attributes related to the fields. Examples of the other attributes could range from inherent attributes, such as soil moisture level, to environmental attributes, such as soil management practice. Other machine-learning methods known to someone skilled in the art for capturing various relationship between the seeding rate (in conjunction with other attributes) and the crop yield lift, such as neural networks or regression techniques, can also be used. The more complex approach can produce more granular information beyond whether a lift is possible and towards how much lift might be possible.

In some embodiments, the server 170 is programmed to next determine grower-specific product responsiveness. For a grower's field, the server 170 is programmed to similarly review the historical crop yield data over a number of years for a specific zone within the field or the field on average and identify the hybrid and current seeding rate for the field or zone. Referring back to FIG. 8 illustrating the relationship between the crop density and the crop yield for an appropriate hybrid, the slope threshold discussed above, such as 1.5 based on the slope for the first slope line 810, can be used to determine whether the grower's field is likely to be responsive to a certain seeding rate increase. For example, a second slope line 814 can be formed from the data point 816 corresponding to the current seeding rate and the data point 806 corresponding to the optimal seeding rate and the highest crop yield. When the current seeding rate is smaller than the optimal seeding rate, the slope of the second slope line will be positive but could be above or below the threshold noted above. The server 170 can be configured to deem the field responsive to a seeding rate increase to the optimal seeding rate when the slope of the second slope line is at or above the threshold. When the current seeding rate is larger than the optimal seeding rate, the slope of the second slope line will be negative. The server 170 can then be configured to evaluate the product responsiveness of the field to a seeding rate decrease. The server 170 can be configured to similarly evaluate the product responsiveness of the field to a seeding rate increase to a target seeding rate less than the optimal seeding rate.

In some embodiments, the server 170 is programmed to apply one of the more complex approaches, such as the decision tree discussed above, to evaluate grower-specific product responsiveness. At least the current seeding rate of a grower's field and an intended or target seeding rate for the grower's field could be fed into the decision tree, and a range of crop yield lift values can be estimated by the decision tree, which can be further categorized into responsive or unresponsive or other granular or different classes.

Figure 9:
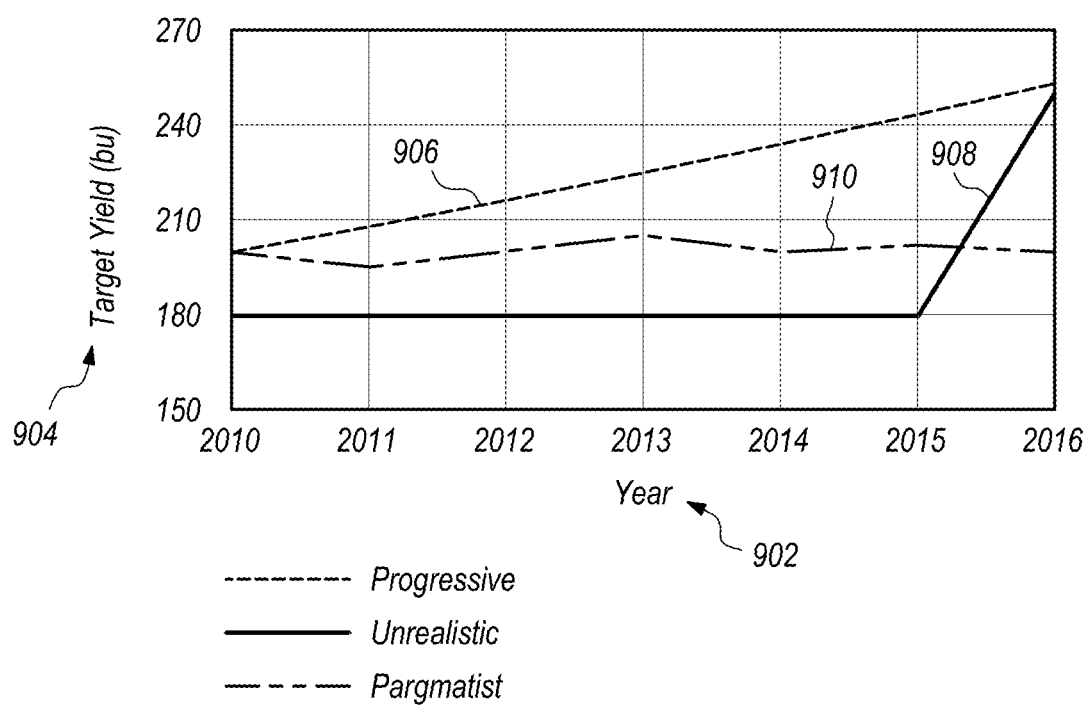
FIG. 9 illustrates example types of management practice.

In some embodiments, the server 170 is programmed to evaluate the grower's field management practice in terms of lifting crop yield over time. FIG. 9 illustrates example types of management practice. The X-axis 902 corresponds to the year, the Y-axis 904 corresponds to the target or actual crop yield. The type of management practice in terms lifting crop yield can be reflected in various curves. The curve 906 indicates an aggressive type, where there is steady and significant increase in crop yield one year after another. The curve 910 indicates a conservative or pragmatic type, where there is no significant increase in crop yield from one year to the next. The curve 908 indicates an unrealistic type, where there is no change in crop yield for some years but then there is a sharp increase. Identifying the type of management practice or other aspects external to the soil can be helpful in prescribing actual experiments to targeted growers' fields. In other embodiments, the type of management practice can also be an input attribute for a machine learning method discussed above.

In some embodiments, the server 170 is programmed to also evaluate the degree of variability within the grower's field. Actual density data might be available for different zones within the field, or aerial images of the field can be analyzed via image analysis techniques known to someone skilled in the art. Based on such data, the server 170 can be programmed to determine whether the crop densities or seeding rates are more or less constant across the field or vary substantially among different zones. Such determination can also be useful in prescribing actual experiments to targeted growers' fields.

Figure 10:
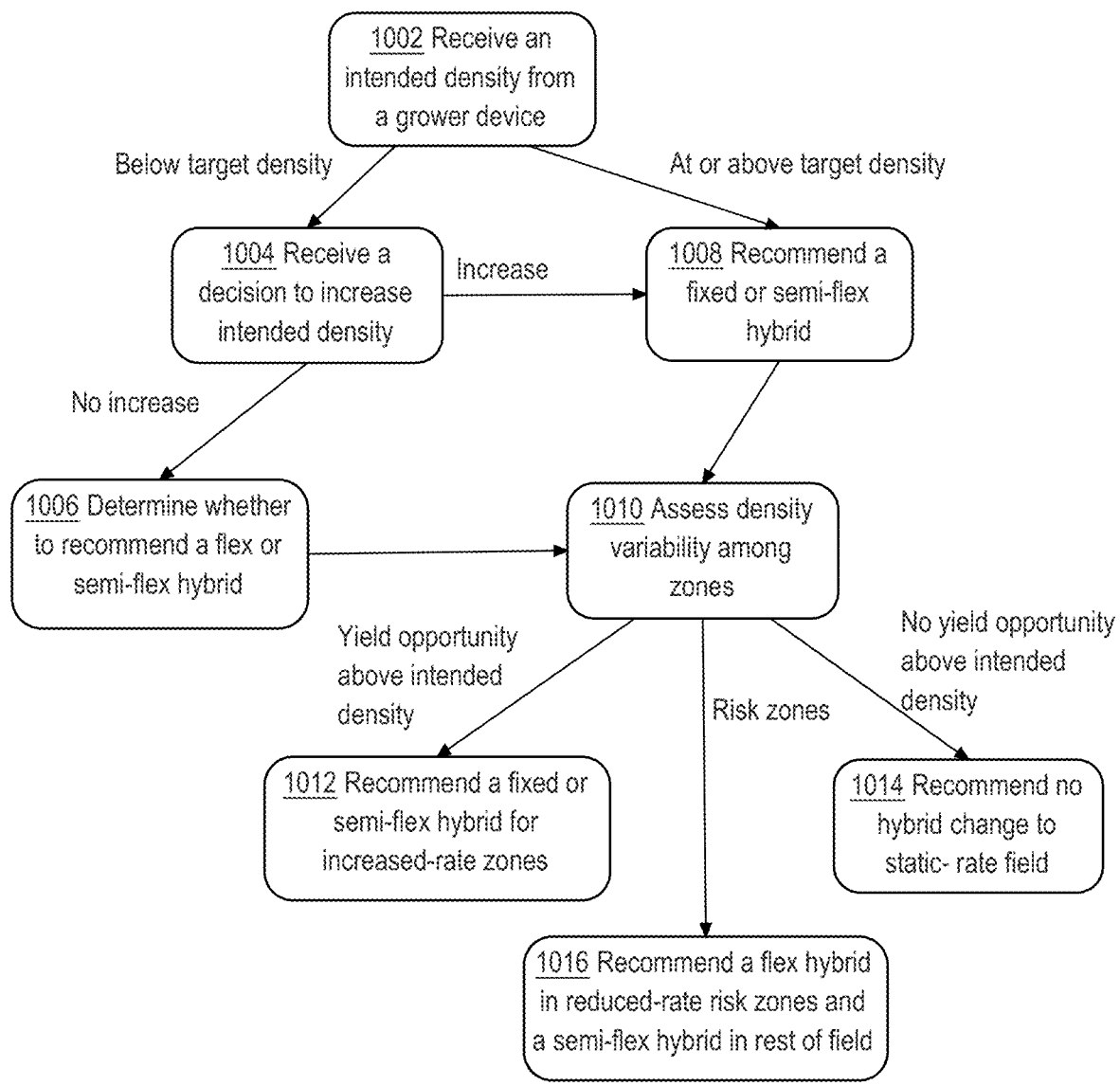
FIG. 10 illustrates an example process performed by the field study server to determine the crop hybrid for a grower's field or the zones thereof.

In some embodiments, the server 170 is programmed to target those growers' fields that are responsive to increasing seeding rates and design experiments for those fields. Each design can have various parameters, such as the crop hybrid, the zone variability, or the seeding rate increase. FIG. 10 illustrates an example process performed by the field study server to determine the crop hybrid for a grower's field or the zones thereof. In some embodiments, in step 1002, the server 170 is programmed to communicate with a grower device associated with a targeted field. Specifically, the server 170 is configured to receive an intended density or seeding rate for the field from the grower device. The intended density is typically larger than the current aggregate density in the field. The server 170 is programmed to then determine how the intended density compares with a target density for the field. The target density may be predetermined for the field based on a combination of approaches, such as a comparison with a computed average or optimal seeding rate, a classification via an established seeding-rate decision tree, or an evaluation of the type of management practice in terms of lifting crop yield, as discussed above. The target density is also typically larger than the current aggregate density in the field. When the intended density is below the target density, in step 1004, the server 170 is configured to then receive a decision regarding whether to increase the intended density to the target density from the grower device. When the decision is not to increase the intended density, in step 1006, the server 170 is configured to compute the variance of the intended density from the target density. When the variance is above a certain threshold so that the intended density remains sufficiently low, the server 170 is configured to recommend a flex or semi-flex hybrid for the field. For example, the certain threshold can be 80% of the target density. In some embodiments, when the intended density is at or above the target density reaching a substantially large value, in step 1008, the server 170 is configured to recommend a fixed or semi-flex hybrid for the field.

In some embodiments, the server 170 is programmed to next respond to zone variability within the targeted field. Specifically, in step 1010, the server 170 is configured to determine whether there is significant variability in seeding rates among different zones within the field and the current aggregate density considered so far is merely an aggregate across the field. The server 170 may be configured to further determine whether a certain zone may benefit from higher seeding rates from the intended seeding rate, based on the difference between the current seeding rate of the certain zone with respect to the current aggregate density, the intended seeding rate, and the target seeding rate. For example, when the difference between the current seeding rate of the certain zone and the current aggregate density is above a specific threshold, such as 30% of the current aggregate density, and when the intended density is less than the target density, the current seeding rate of the certain zone may be increased to be beyond the intended density. In such cases where a yield opportunity exists for a seeding rate that is higher than the intended seeding rate, in step 1012, the server 170 is configured to recommend a fixed or a semi-flex hybrid due to the relatively large density limitation. In other cases where no yield opportunity exists for a seeding rate that is higher than the intended seeding rate, in step 1014, the server 170 is configured to recommend no hybrid change for the static-rate field. In addition, the server 170 may be configured to further determine whether a certain zone may benefit from lower seeding rates from the intended seeding rate. Such a zone may be a risk zone suffering from drought or other natural or environmental attack. Therefore, in step 1016, the server 170 may be configured to recommend a flex hybrid for such a zone corresponding to a relatively low current seeding rate or intended seeding rate to facilitate retainment of water or encourage further crop growth.

FIG. 11 illustrates an example process performed by the field study server of targeting grower fields for crop yield lift.

In some embodiments, in step 1102, the server 170 is programmed to receive crop seeding rate data and corresponding crop yield data over a period of time regarding a group of fields associated with a plurality of grower devices. Such data is used to establish benchmarks for determining product responsiveness to a seeding rate increase for a grower's field. The group of fields may be selected from those fields that share values with the grower's field in certain characteristics, such as the crop hybrid grown in a field, the yield lift management practice for a field, or the location of a field. The time coverage of the data allows the effect of seeding rate increases on the crop yield lift to be revealed. As discussed above, at least an optimal seeding rate and a corresponding threshold on the effect of a seeding rate increase on the crop yield lift can be determined, and more complex approaches can be developed for characterizing or determining the potential impact of a seeding rate change on the crop yield in a grower's field and ultimately whether the grower's field should be targeted for specific experiments to lift the crop yield. In step 1104, the server 170 is programmed to receive a current seeding rate for a grower's field associated with one of a plurality of grower devices. The current seeding rate can be an aggregate across different zones within the field.

In step 1106, the server 170 is programmed to further determine whether the grower's field will be responsive to increasing a crop seeding rate for the grower's field from the current seeding rate to a target seeding rate based on the crop seeding rate data and the corresponding crop yield data. The target seeding rate can be set as the optimal seeding rate or a value that is more consistent with the yield lift management practice for the field or other intent of the grower. Essentially, from the relationship between the seeding rate and the crop yield demonstrated by the group of fields, which can be derived from the crop seeding rate data and the corresponding crop yield data, the server 170 is configured or programmed to estimate an impact of a seeding rate change from the current seeding rate to the target seeding rate in the grower's field and in turn determine whether the grower's field will effectively respond to the seeding rate change by producing the desired crop yield lift.

In step 1108, in response to determining that the grower's field will be responsive, the server 170 is programmed to target the grower's field for an experiment to increase the crop yield and prepare a prescription for the experiment, including a new crop seeding rate and a specific crop hybrid to be implemented in the grower's field. The new crop seeding rate can be the target seeding rate unless it is overridden by an intended seeding rate provided by the grower device. Any recommended change in the crop hybrid is generally consistent with the change in the seeding rate, and it can be implemented incrementally within the field or gradually over time to be able to achieve as much of the estimated crop yield lift as possible. Furthermore, the server 170 can be configured to evaluate the variability in crop yield within the grower's field and prepare a more granular prescription. Such evaluation can be based on physical samples from the field or aerial images of the field. A higher seeding rate than the new seeding rate can often be additionally prescribed to a zone having a seeding rate higher than the current seeding rate. Similarly, a lower seeding rate than the new seeding rate can be additionally prescribed to a zone having a seeding rate lower than the current seeding rate.

As illustrated in FIG. 7, the server 170 can be programed to further collect results of implementing the prescribed experiments from the one grower device or directly from agricultural implements the prescribed the experiments. Specifically, the predicted crop yield lift can be validated against the actual crop yield lift. The server 170 can be configured to then distribute data related to the experiment and the validated results to the other grower devices associated with the group of fields. The seeding rate data and the crop yield data can also be updated with the validated result to enable more accurate modeling of the relationship between crop seeding rates and crop yield.

What is claimed is:

1. A computer-implemented method of targeting grower fields, comprising:
receiving, by a processor, a prescription of a trial for a grower's field, the trial including an attribute of a field and an objective of the field, wherein a change in a value of the attribute results in a change in a value of the objective;
receiving, by the processor, attribute data including values of the attribute and corresponding objective data including corresponding values of the objective over a period of time regarding a group of fields associated with a plurality of grower devices;
receiving a current value of the attribute for the grower's field associated with a specific grower device;
identifying a target value for the attribute;
determining, after the identifying, whether the grower's field will be responsive with an improvement in the objective to changing a value of the attribute for the grower's field from the current value to the target value, wherein an impact of changing values of the attribute for the grower's field on improving values of the objective is above a slope threshold on responsiveness, the determining being based on a relationship between the attribute data and the corresponding objective data;
preparing, in response to determining that the grower's field will be responsive, a prescription as an executable script to be implemented in the grower's field, the prescription identifying a new value for the attribute different from the current value; and
transmitting the executable script to an agricultural apparatus, the executable script once received driving operation of the agricultural apparatus, including effecting the new value for the attribute in the grower's field according to the prescription.

2. The computer-implemented method of claim 1,
the attribute being a crop seeding rate,
the attribute data being crop seeding rate data,
the objective being a crop yield,
the objective data being crop yield data, and
the improvement in the objective being an increase in the crop yield.

3. The computer-implemented method of claim 2, further comprising:
computing an optimal seeding rate from the crop seeding rate data and the corresponding crop yield data, the optimal seeding rate corresponding to a maximal crop yield for the group of fields,
the target seeding rate being up to the optimal seeding rate.

4. The computer-implemented method of claim 3, further comprising:
calculating a relationship correlating the crop seeding rate data and the corresponding crop yield data;
estimating a potential impact of increasing a crop seeding rate from a minimum value to the optimal seeding rate on crop yield lift from the relationship; and
identifying a threshold on responsiveness to a seeding rate increase based on the potential impact.

5. The computer-implemented method of claim 2, further comprising:
receiving information regarding a type of yield lift management practice for a grower's field,
the target seeding rate being related to the type of yield lift management practice.

6. The computer-implemented method of claim 1,
the attribute being an amount of fungicide usage,
the objective being an amount of disease spread, and
the improvement in the objective being a decrease in the amount of disease spread.

7. The computer-implemented method of claim 1, further comprising identifying the group of fields based on one or more of a crop hybrid grown in a field, a yield lift management practice for a field, and a location of a field.

8. The computer-implemented method of claim 1, further comprising receiving specific attribute data from implementing the prescription in a grower's field.

9. The computer-implemented method of claim 8, further comprising:
validating an effect of the prescription based on the specific attribute data; and
distributing a result of the validating to the plurality of grower devices.

10. A computer-implemented method of automated cross-grower analysis, comprising:
targeting grower fields, comprising creating predictions that an attribute of an agricultural field is related to an experimental objective and that a change in a value of the attribute leads to an improvement in the experimental objective in a set of agricultural fields;
prescribing one or more experiments to one or more agricultural fields based on the targeting, comprising transmitting control signals to agricultural implements in the one or more agricultural fields to implement prescriptions of the one or more experiments, the prescriptions including details for implementing a targeted trial and a control trial;
receiving in-season data related to the one or more experiments from the agricultural implements, the in-season data including values of the attribute;
validating execution of the one or more experiments against the prescriptions using the in-season data;
receiving end-of-season data related to the one or more experiments from the agricultural implements, the end-of-season data including values of the experimental objective;
analyzing the in-season data and the end-of-season data against the predictions; and
distributing in results of the analyzing to devices associated with a plurality of growers of a plurality of agricultural fields.

11. The computer-implemented method of claim 10,
the attribute being a crop seeding rate,
the experimental objective being a crop yield, and
the improvement in the experimental objective being an increase in the crop yield.

12. The computer-implemented method of claim 11, the control signals indicating a type of seeds, a destination of the seeds within a field, a volume of the seeds to plant each day, or a time to plan the seeds each day.

13. The computer-implemented method of claim 10,
the attribute being an amount of fungicide usage,
the experimental objective being an amount of disease spread, and
the improvement in the experimental objective being a decrease in the amount of disease spread.

14. The computer-implemented method of claim 10, the prescribing further comprising applying the one or more experiments to the one or more agricultural fields, which have largest improvements in the experimental objective.

15. The computer-implemented method of claim 10, further comprising:
detecting occurrence of one or more triggers, including under-performance of a grower's field, an unusual condition of the grower's field, a change in an environment of the grower's field, or production of a certain outcome in the grower's field,
the targeting being performed in response to the detecting.

16. The computer-implemented method of claim 10, the prescribing further comprising:
dividing a grower's field into strips; and
designating the strips as being part of the targeted trial or the control trial alternatingly or randomly.

17. The computer-implemented method of claim 10, the control signals indicating a wakeup time of an agricultural implement, a moving or rotational speed of the agricultural implement, or a route taken by the agricultural implement in a grower's field.

18. The computer-implemented method of claim 10, the validating further comprising, for a variable involved in an experiment:
comparing an actual value from the in-season data and a corresponding prescribed value; and
transmitting a warning or remedial information to a remote device in response to a discrepancy between the actual value and the prescribed value.

19. The computer-implemented method of claim 10, wherein a specific experiment of the one or more experiments involves multiple stages, and
wherein a prescribed value of an attribute changes incrementally in a next stage of the multiple stages when an actual outcome agrees with a predicted outcome in a current stage of the multiple stages.

20. The computer-implemented method of claim 10, the results indicating one or more experiments prescribed to a first grower's field that are similar to an experiment prescribed to a second grower's field or outlining possible future experiments to apply to a second grower's field.

* * * * *